(12) United States Patent
Yamada et al.

(10) Patent No.: US 12,096,063 B2
(45) Date of Patent: Sep. 17, 2024

(54) CONTENT PROVIDING SYSTEM, CONTENT PROVIDING METHOD, AND STORAGE MEDIUM

(71) Applicant: HONDA MOTOR CO., LTD., Tokyo (JP)

(72) Inventors: Taiki Yamada, Tokyo (JP); Takashi Miyata, Tokyo (JP); Tomoaki Hagihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/125,752

(22) Filed: Mar. 24, 2023

(65) Prior Publication Data

US 2023/0319337 A1    Oct. 5, 2023

(30) Foreign Application Priority Data

Mar. 29, 2022  (JP) ................................ 2022-053174

(51) Int. Cl.
*H04N 21/414* (2011.01)
*G06Q 10/02* (2012.01)
*H04N 21/45* (2011.01)

(52) U.S. Cl.
CPC ....... *H04N 21/41422* (2013.01); *G06Q 10/02* (2013.01); *H04N 21/4532* (2013.01)

(58) Field of Classification Search
CPC ......... H04N 21/4532; H04N 21/41407; H04N 21/4722; H04N 21/25891
See application file for complete search history.

(56) References Cited

U.S. PATENT DOCUMENTS

| 2016/0350065 | A1* | 12/2016 | Markovitz | ............ | G06F 16/635 |
| 2019/0014371 | A1* | 1/2019 | Couleaud | ............. | H04N 21/431 |
| 2019/0075359 | A1* | 3/2019 | Boss | .................. | H04N 21/4532 |
| 2021/0321236 | A1* | 10/2021 | Turk | ...................... | H04W 4/70 |
| 2023/0319337 | A1* | 10/2023 | Yamada | ........... | H04N 21/41422 |
| | | | | | 725/75 |

FOREIGN PATENT DOCUMENTS

JP    2004-078640    3/2004

* cited by examiner

*Primary Examiner* — Jason Salce
(74) *Attorney, Agent, or Firm* — Amin, Turocy & Watson, LLP (57) ABSTRACT

Provided is a content providing system in which one or more processors acquire information for specifying a time of use of a vehicle for public transportation which is used by a user who plans to use the vehicle and information indicating the user's content preference and set content to be provided in the vehicle (hereinafter referred to as target content) on the basis of the acquired information.

6 Claims, 6 Drawing Sheets

| USER ID | DEPARTURE POINT | DESTINATION | DESIRED DEPARTURE TIME | DESIRED ARRIVAL TIME | ... |
|---|---|---|---|---|---|
| 001 | ** | ** | ** | ** | ... |
| 002 | ** | ** | ** | ** | ... |
| 003 | ** | ** | ** | ** | ... |
| : | : | : | : | : | : |

| VEHICLE ID | CURRENT LOCATION | TRAVEL SCHEDULE | SHUTTLING, ALLOCATED, WAITING | ... |
|---|---|---|---|---|
| M1 | ** | ** | SHUTTLING | ... |
| M2 | ** | – | WAITING | ... |
| M3 | ** | ** | ALLOCATED | ... |
| : | : | : | : | : |

| USER ID | PREFERENCE PATTERN | FAVORITES LIST | PLAYLIST |
|---|---|---|---|
| 001 | A | ** | ** |
| 002 | B | ** | ** |
| 003 | C | ** | ** |
| : | : | : | : |

# CONTENT PROVIDING SYSTEM, CONTENT PROVIDING METHOD, AND STORAGE MEDIUM

CROSS-REFERENCE TO RELATED APPLICATION

Priority is claimed on Japanese Patent Application No. 2022-053174, filed Mar. 29, 2022, the content of which is incorporated herein by reference.

BACKGROUND

Field

The present disclosure relates to a content providing system, a content providing method, and a storage medium.

Description of Related Art

In the past, a content delivery system that plays back content meeting a user's preference on the user's terminal while the user is on board a train has been disclosed (Japanese Unexamined Patent Application, First Publication No. 2004-78640).

SUMMARY

In the related art, it has been assumed that users who use a train view content individually using their own terminals, and it has been necessary to operate the terminals when the users are on board the train. For this reason, there have been cases where the users' satisfaction is low when the users travel using a public vehicle.

The present disclosure was contrived in view of such circumstances, and one object thereof is to provide a content providing system, a content providing method, and a storage medium that make it possible to improve a user's satisfaction.

The following configurations are adopted in a content providing system, a content providing method, and a storage medium according to this disclosure.

(1) According to an aspect of this disclosure, a content providing system is provided wherein one or more processors acquire information for specifying a time of use of a vehicle for public transportation which is used by a user who plans to use the vehicle and information indicating the user's content preference, and set content to be provided in the vehicle (hereinafter referred to as target content) on the basis of the acquired information.

(2) In the aspect of the above (1), the one or more processors set content that meets the user's preference within the time of use as target content to be provided in the vehicle.

(3) In the aspect of the above (2), the one or more processors acquire schedule information for content scheduled to be provided in the vehicle for a predetermined period of time before or after the time of use, and in a case where the schedule information includes the target content or content similar to the target content, the content of the schedule information is changed such that the target content or content similar to the target content is not included.

(4) In the aspect of the above (3), the one or more processors acquire schedule information for content scheduled to be provided in the vehicle for a predetermined period of time before or after the time of use, and in a case where an attribute of the content included in the schedule information is not identical or similar to an attribute of the target content, the content of the schedule information is changed to content which is identical or similar to the attribute of the target content.

(5) In the aspect of the above (2), the one or more processors acquire schedule information for content scheduled to be provided in the vehicle for a predetermined period of time before or after the time of use, and in a case where an attribute of content of interest included in the schedule information is not identical or similar to an attribute of the target content, a schedule is changed such that the target content and content similar to the content of interest are provided between the target content and the content of interest.

(6) In any aspect of the above (1) to (5), the information for specifying time of use of the vehicle is one or both of a time designated by the user as the time of use of the vehicle and a combination of a boarding position and an alighting position designated by the user and a boarding time and an alighting time estimated on the basis of traffic information.

(7) In any aspect of the above (1) to (6), the vehicle is a ridesharing vehicle which is boarded by a plurality of users at different positions, and the one or more processors set target content that meets preferences of one or more target users among the plurality of users and adjust a schedule of content to be provided in the vehicle such that the same content is not provided to users different from the target users.

(8) According to another aspect of the present disclosure, the one or more processors set content that meets the user's preference within the time of use as target content to be provided in the vehicle to provide the user with the target content via a device which is used by the user.

(9) According to another aspect of the present disclosure, a content providing method is provided wherein a computer acquires information for specifying a time of use of a vehicle for public transportation which is used by a user who plans to use the vehicle and information indicating the user's content preference and sets content to be provided in the vehicle (hereinafter referred to as "target content") on the basis of the acquired information.

(10) According to another aspect of the present disclosure, a non-transitory computer-readable storage medium is provided having a program stored therein, the program causing a computer to: acquire information for specifying a time of use of a vehicle for public transportation which is used by a user who plans to use the vehicle and information indicating the user's content preference and set content to be provided in the vehicle (hereinafter referred to as target content) on the basis of the acquired information.

According to the aspects of (1) to (9), the user's satisfaction is improved. For example, since content that meets the user's preference is provided in a vehicle for public transportation, the user's satisfaction may be improved.

DETAILED DESCRIPTION

Hereinafter, an embodiment of a content providing system, a content providing method, and a storage medium of the present disclosure will be described with reference to the accompanying drawings. As used throughout this disclosure, the singular forms "a," "an," and "the" include plural reference unless the context clearly dictates otherwise.

A content providing system of the present embodiment acquires information for specifying the time of use of a vehicle for public transportation which is used by a user who plans to use the vehicle and information indicating the user's content preference, and sets content to be provided in the vehicle (hereinafter referred to as target content) on the basis of the acquired information.

Examples of the vehicle for public transportation include vehicles with space for an occupant to stay (such as four-wheeled or three-wheeled vehicles, micro mobility, and railway vehicles), and the like. Examples of the vehicle for public transportation include vehicles, taxis, and the like that perform pickup or shuttle in response to a user's request. The information for specifying the time of use is a time designated by the user as the time of use of the vehicle, a combination of a boarding position designated by the user and an alighting position designated by the user and a boarding time (scheduled boarding time) and an alighting time (scheduled alighting time) estimated on the basis of traffic information, or the like. The information for specifying the time of use may be acquired, for example, on the basis of information that the user actually boarded and alighted from the vehicle. The time of use is, for example, an estimated time of boarding or an actual time of boarding. To be provided in the vehicle involves, for example, being provided without depending on the user's operation, and involves, for example, content being automatically provided from a device of the vehicle or a device in the vehicle (for example, a portable terminal device) when the user is on board the vehicle. To be provided in the vehicle involves, for example, content being provided in a way that can be recognized by a plurality of users who are on board the vehicle, and involves, for example, content being provided to a plurality of users who are on board the vehicle from the speaker of the vehicle or the speaker of a portable terminal device placed in the vehicle (content being provided to users when there are no other occupants).

The content providing system sets content that meets the user's preference as content to be provided in the vehicle during the time of use of the vehicle for public transportation which is used by the user who plans to use the vehicle. The content providing system provides the user with content that meets the user's preference during the time of use of the vehicle which is used by the user. These embodiments will be described below.

Figure 1:
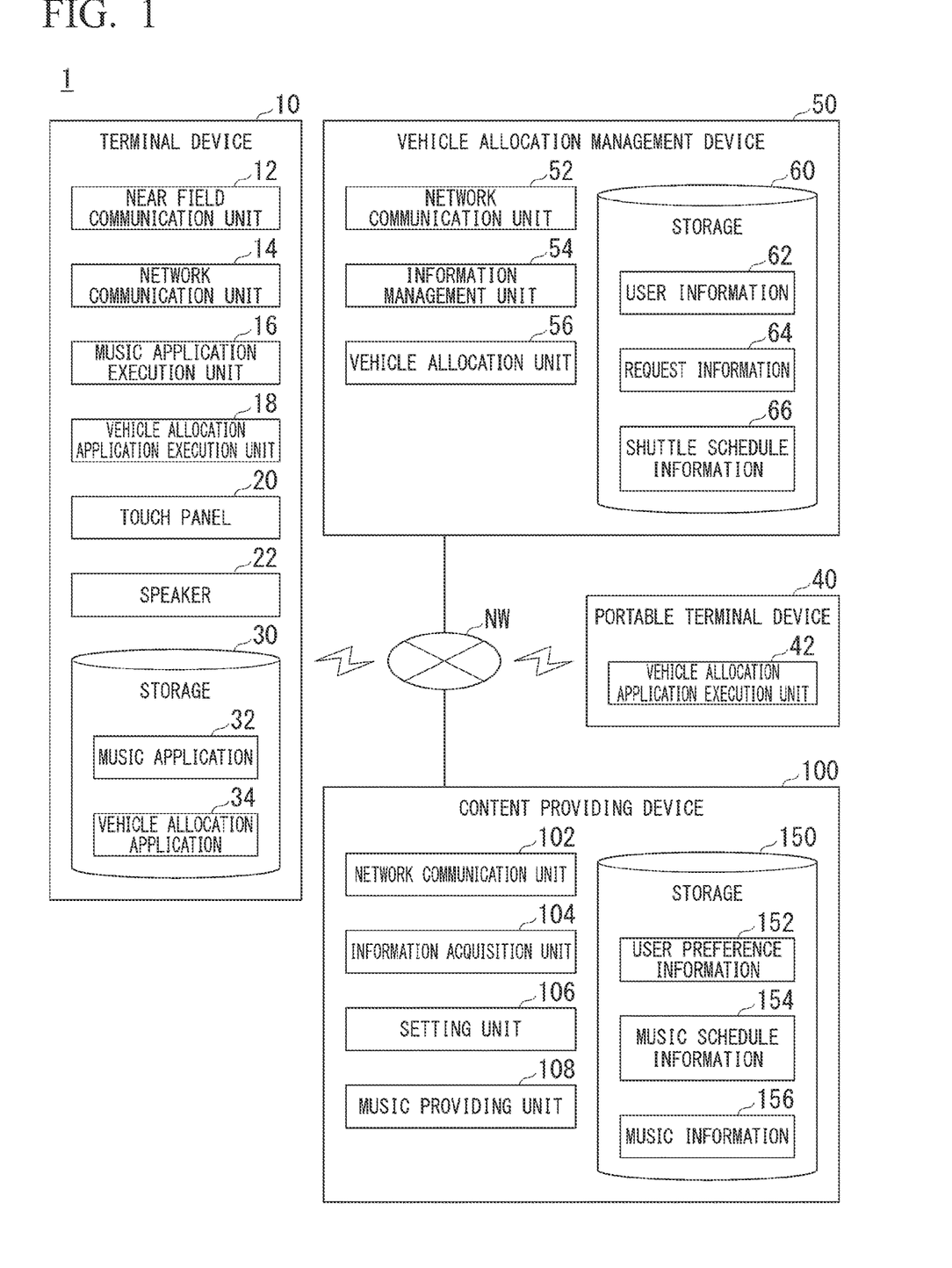
FIG. 1 is a configuration diagram of a content providing system using a content providing device of an embodiment.

FIG. 1 is a configuration diagram of a content providing system 1 using an application program and a content providing device of an embodiment. The content providing system 1 is a system that provides content to a user's terminal device. The content is, for example, a musical piece. The musical piece is music and may include an artist's song, performance, or program-playback music, as well as environmental sounds, and the like. In the following description, it is assumed that the content is a musical piece, but the content may also be video content accompanied by images, or the like.

[Terminal Device]

A terminal device 10 is, for example, an on-board device. The terminal device 10 may be a smartphone or a tablet terminal. In a case where the terminal device 10 is a smartphone or a tablet terminal, the terminal device 10 may be placed inside a vehicle and cause the on-board device to play back music using near-field wireless communication.

The terminal device 10 is, for example, a stationary or portable computer device having a communication function, an input/output function (display function), and an application execution function of a processor. The terminal device 10 includes, for example, a near field communication unit 12, a network communication unit 14, a music application execution unit 16, a vehicle allocation application execution unit 18, a touch panel 20, and a speaker 22.

The near field communication unit 12 communicates with a portable terminal device in a wireless or wired manner on the basis of a communication standard such as Bluetooth (registered trademark), Wi-Fi, or Universal Serial Bus (USB). For example, the near field communication unit communicates with a user's portable terminal device (for example, a smartphone).

The network communication unit 14 communicates with a content providing device 100 through a network NW. The network NW includes wireless base stations, access points, the Internet, provider terminals, wide area networks (WAN), and the like.

The music application execution unit 16 functions by a processor such as a central processing unit (CPU) executing a music application 32 stored in a storage 30. The music application execution unit 16 controls each unit of the terminal device 10 in accordance with a user's input operation performed on the touch panel 20. The music application 32 is, for example, installed in the terminal device 10 in advance from the server device of an application provider.

The music application execution unit 16 performs processing of acquiring music from the content providing device 100 in, for example, a streaming format and causing the speaker 22 or the like (meaning the speaker 22, a device paired through near field communication, a wireless earphone, or the like) to play back the music. The music application execution unit 16 operates in various modes such as a single mode for allowing the user to designate musical pieces one by one and an automatic playback mode for sequentially playing back musical pieces in an order recommended by the content providing device 100 after receiving the designation of a musical piece.

The vehicle allocation application execution unit 18 functions by a processor such as a CPU executing a vehicle allocation application 34 stored in the storage 30. The vehicle allocation application execution unit 18 communicates with a vehicle allocation management device 50 to provide a shuttle service to the user. The shuttle service is a service of picking up the user at the departure point and transporting the user to the destination in response to the user's request. The service provider, for example, obtains compensation for shuttle from a business operator who manages the vehicle allocation management device 50. The vehicle allocation application execution unit 18 provides various types of information to a driver. The vehicle allocation application execution unit 18 causes, for example, a display unit to display the user's request such as the departure point and the destination described above or causes the display unit to display the time of pickup at the departure point.

The vehicle allocation application execution unit 18 acquires, for example, position information and provides the acquired position information to the vehicle allocation management device 50. The position information is, for example, information measured by a location positioning device (such as a Global Positioning System (GPS) receiver which is not shown) included in the terminal device 10 or another device capable of communicating with the terminal device.

The music application 32 and the vehicle allocation application 34 or either of the two may be stored in a storage of a terminal device such as the smartphone or the tablet terminal as described above. For example, the music application 32 may be stored in the storage 30 of an on-board device and the music application execution unit 16 may function in the on-board device. The vehicle allocation application 34 may be stored in the storage of the terminal device such as the smartphone or the tablet terminal and the vehicle allocation application execution unit 18 may function in the above terminal device.

[Portable Terminal Device]

A portable terminal device 40 is a portable computer device such as, for example, a smartphone or a tablet terminal. The portable terminal device 40 includes, for example, a vehicle allocation application execution unit 42. The vehicle allocation application execution unit 42 functions by a processor such as a CPU executing a vehicle allocation application stored in a storage (not shown). The vehicle allocation application execution unit 42 controls each unit of the portable terminal device 40 in accordance with the user's input operation performed on the touch panel of the portable terminal device 40. The vehicle allocation application is, for example, installed in the portable terminal device 40 in advance from the server device of an application provider. The vehicle allocation application is an application for providing a shuttle service. In the shuttle service, the user can designate ridesharing, personal use, or the like, request vehicle allocation, and go to the destination.

A music application may be stored in the storage of the portable terminal device to realize the same function as the music application execution unit. In this case, for example, the user can operate the music application and receive music from the content providing device 100. For example, information on music played back using the music application or music registered as favorites and the like are provided to the content providing device 100 together with a user ID and are stored in a storage 150 of the content providing device 100.

[Vehicle Allocation Management Device]

The vehicle allocation management device 50 includes, for example, a network communication unit 52, an information management unit 54, a vehicle allocation unit 56, and a storage 60. The information management unit 54 and the vehicle allocation unit 56 are realized by a hardware processor such as, for example, a CPU executing a program (software). Some or all of these components may be realized by hardware (a circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as a hard disk drive (HDD) or a flash memory (a storage device including a non-transitory storage medium) in advance, may be stored in a detachable storage medium such as a DVD or a CD-ROM (non-transitory storage medium), or may be installed by the storage medium being installed in a drive device. The storage 60 includes, for example, user information 62, request information 64, and shuttle schedule information 66. The user information 62 is, for example, information in which various types of information such as the usage history, settlement method, evaluation, and the like of the user's shuttle service is associated with the user's identification information. The details of other information will be described later.

The network communication unit 52 communicates with the terminal device 10 through the network NW.

Figure 2:
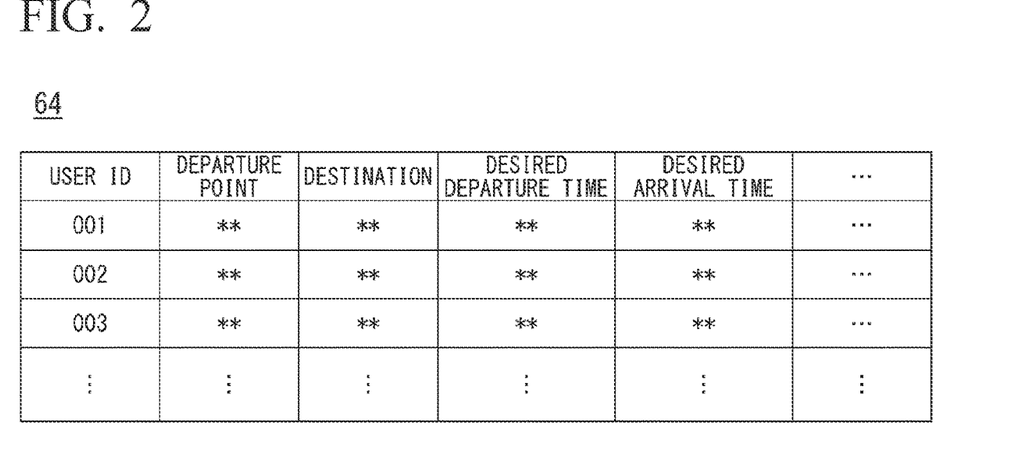
FIG. 2 is a diagram illustrating an example of content of request information.

The information management unit 54 acquires request information for use of the shuttle service from the portable terminal device 40 and manages the acquired request information. FIG. 2 is a diagram illustrating an example of content of the request information 64. The request information 64 is, for example, information in which a user ID, a departure point, a destination, a desired departure time, and a desired arrival time are associated with each other. In the example of FIG. 2, the request information for use of the shuttle service provided by each of a plurality of users is included.

Figure 3:
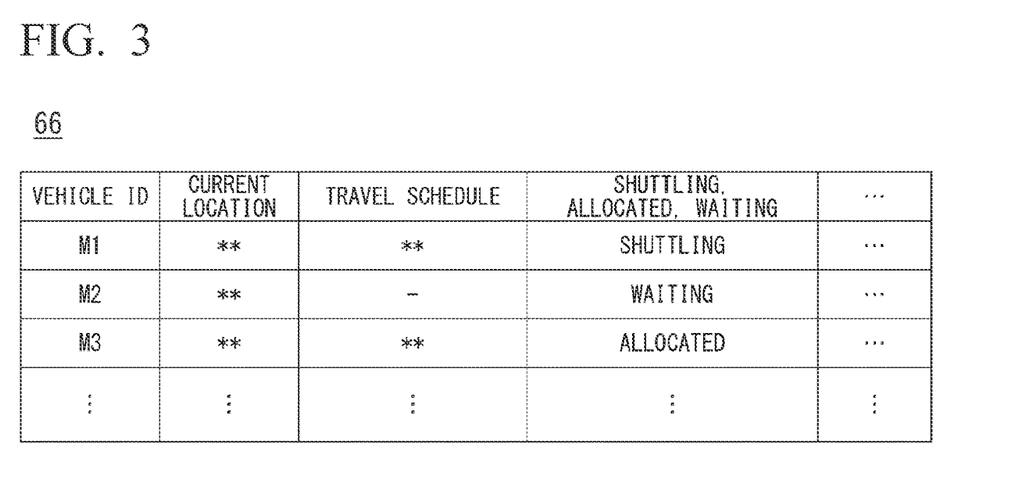
FIG. 3 is a diagram illustrating an example of content of shuttle schedule information.

The vehicle allocation unit 56 generates the shuttle schedule information 66 of the shuttle service on the basis of the request information and the position information of the vehicle. FIG. 3 is a diagram illustrating an example of content of the shuttle schedule information 66. The shuttle schedule information 66 is, for example, information in which a vehicle ID, a current location, travel schedule information of the vehicle, and the state of the vehicle (shuttling, allocated, or waiting) are associated with each other. For example, the vehicle allocation unit 56 provides the request information for use of the user's shuttle service to a vehicle (the terminal device 10) which is located near the user and is waiting. In a case where a driver holding the terminal device 10 indicates his/her intention to respond to the request information, the vehicle allocation unit 56 allocates the vehicle as a vehicle for the shuttle service. For example, in a case where a vehicle M3 is allocated as shown in FIG. 3, the vehicle allocation unit 56 updates the vehicle M3 as having been allocated in the shuttle schedule information 66. The vehicle allocation unit 56 may also generate a schedule for sharing a ride with users whose destinations are close to each other or are in the same direction.

[Content Providing Device]

The content providing device 100 includes, for example, a network communication unit 102, an information acquisition unit 104, a setting unit 106, a music providing unit 108, and the storage 150. Components other than the network communication unit 102 and the storage 150 are realized by a hardware processor such as, for example, a CPU executing a program (software). Some or all of these components may be realized by hardware (a circuit unit; including circuitry) such as an LSI, an ASIC, an FPGA, or a GPU, or may be realized by software and hardware in cooperation. The program may be stored in a storage device such as an HDD or a flash memory (a storage device including a non-transitory storage medium) in advance, may be stored in a detachable storage medium such as a DVD or a CD-ROM (non-transitory storage medium), or may be installed by the storage medium being installed in a drive device. The storage 150 stores user preference information 152, music schedule information 154, and music information 156. The details of the information will be described later. Some or all of the functional configurations included in the content providing device 100 may be included in another device.

The network communication unit 102 communicates with the terminal device through the network NW.

The information acquisition unit 104 acquires information for specifying the time of use for the user to board the vehicle in the shuttle service and information indicating the user's content preference. The information for specifying the time of use is obtained on the basis of the time at which the user boards the vehicle at the departure point and the time at which the user alights from the vehicle at the destination. The information may be obtained on the basis of the position information of the portable terminal device 40 of the user and the position information of the terminal device 10. For example, the information acquisition unit 104 may recognize that the user is on board the vehicle in a case where the position of the vehicle for the user having received vehicle allocation to board is the same as or close to the position of the portable terminal device 40 of the user. In a case where the user is on board the vehicle, the user may operate the portable terminal device 40 or the driver may operate the terminal device 10 to notify the vehicle allocation management device 50 that the user is on board the vehicle. In this case, the content providing device 100 acquires information corresponding to the notification and specifies the time of use of the vehicle which is used by the user on the basis of the acquired information.

Figure 4:
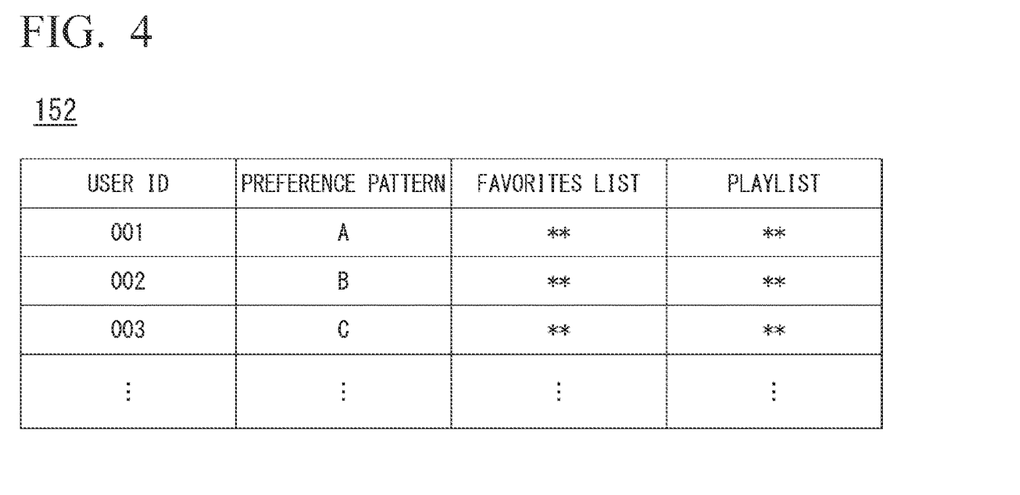
FIG. 4 is a diagram illustrating an example of content of user preference information.

The setting unit 106 acquires information indicating the user's preference from the user preference information 152. FIG. 4 is a diagram illustrating an example of content of the user preference information 152. The user preference information 152 is, for example, information in which a user ID, a preference pattern, a music favorites list, and a playlist are associated with each other. The information associated with the user ID may be a portion of the above. The preference pattern is a pattern obtained by classifying the characteristics of preferences of a plurality of users on the basis of a predetermined rule. The preference pattern may be the genre of music, or information indicating the characteristics of the music (such as, for example, Western music, J-POP, K-POP, or male vocals). The favorites list is a list of music registered as favorites by the user. The playlist is a list of music selected by the user in the past and provided to the user.

The setting unit 106 sets music to be provided in the vehicle when the shuttle service is used (hereinafter referred to as target music) on the basis of the information acquired by the information acquisition unit 104. The setting unit 106 may set music associated with the preference pattern, or may set music registered in the favorites list. The setting unit 106 may set music included in the playlist (for example, music provided multiple times). The details of such processing will be described later.

The music providing unit 108 sequentially transmits music set by the setting unit 106 or passed as a playlist to the terminal device 10 in a streaming format. The music providing unit 108 transmits music to the terminal device 10, for example, on the basis of a schedule for providing music generated by the setting unit 106.

The music providing unit 108 acquires the set music data from the music information 156 when a timing of provision for each piece of music set by the setting unit 106 arrives. The music providing unit 108 transmits the acquired music data to the terminal device 10 and enables the terminal device 10 to play back the music data. The terminal device 10 causes the speaker 22 or the like to playback the music data.

[Details of Processing of Setting Unit]

The setting unit 106 sets target content to be provided in the vehicle on the basis of the information acquired by the information acquisition unit 104. The setting unit 106 sets music that meets the user's preference during the time of use of the vehicle which is used by the user as target music to be provided in the vehicle.

Figure 5:
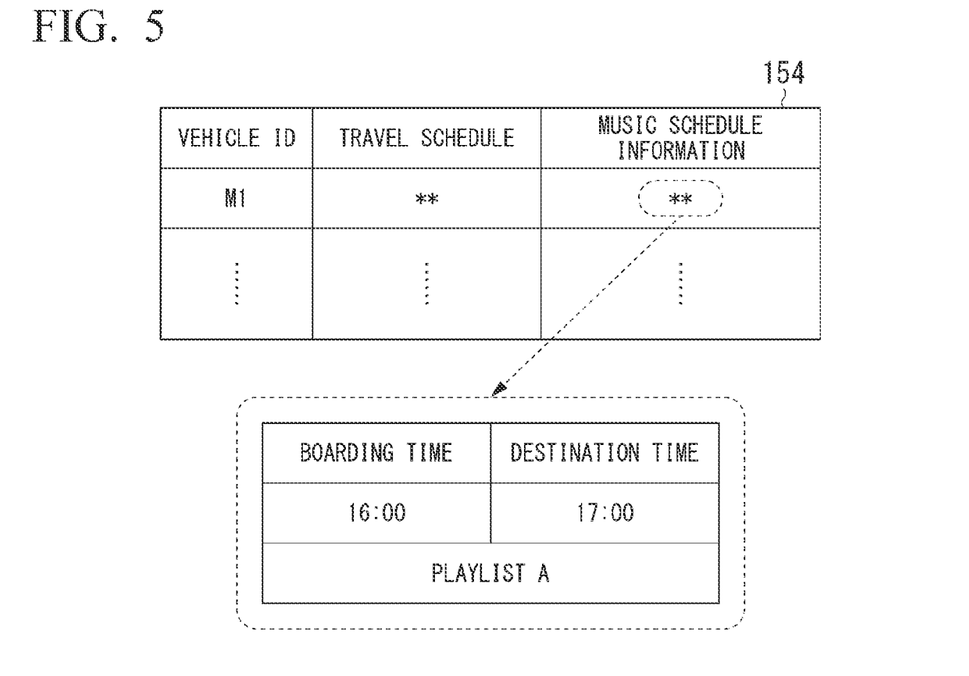
FIG. 5 is a diagram illustrating setting of target music.

FIG. 5 is a diagram illustrating setting of target music. The setting unit 106 refers to the shuttle schedule information 66 to estimate the time of use from when the user boards the vehicle to when the user alights from the vehicle, and refers to the user preference information 152 to set music which is estimated to be preferred by the user during the time of use. As shown in FIG. 5, in a case where it is estimated that the user prefers a playlist A, the setting unit 106 sets the music schedule information 154 such that the playlist A is provided during the time of use. The music schedule information 154 is a schedule for providing music in the vehicle.

Figure 6:
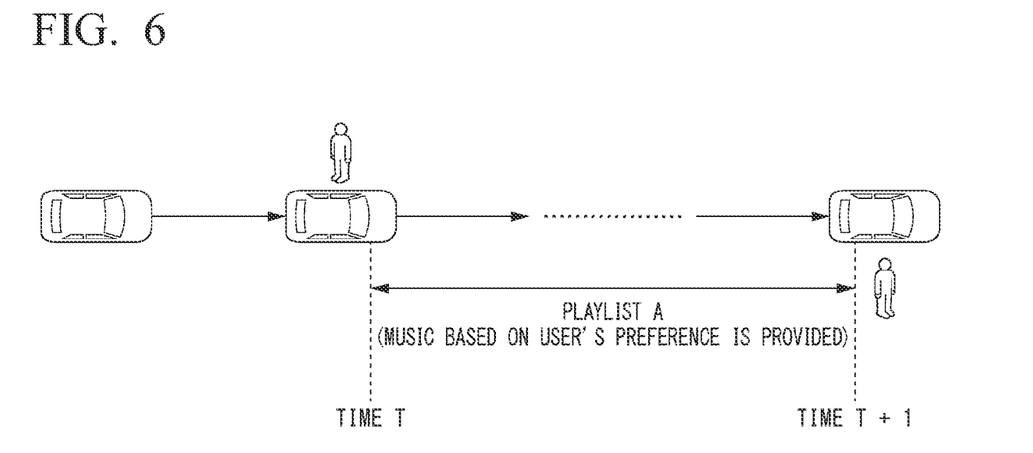
FIG. 6 is a conceptual diagram related to provision of music.

The music providing unit 108 refers to the music schedule information 154 to provide music during the time of use. FIG. 6 is a conceptual diagram related to provision of music. The music providing unit 108 provides music of the playlist A to the user from time T or later when the user boards the vehicle to time T+1 when the user alights from the vehicle.

As described above, since the content providing system 1 provides music that meets the user's preference to the user when the user is on board the vehicle, the user's satisfaction can be improved.

[Sequence Diagram]

Figure 7:
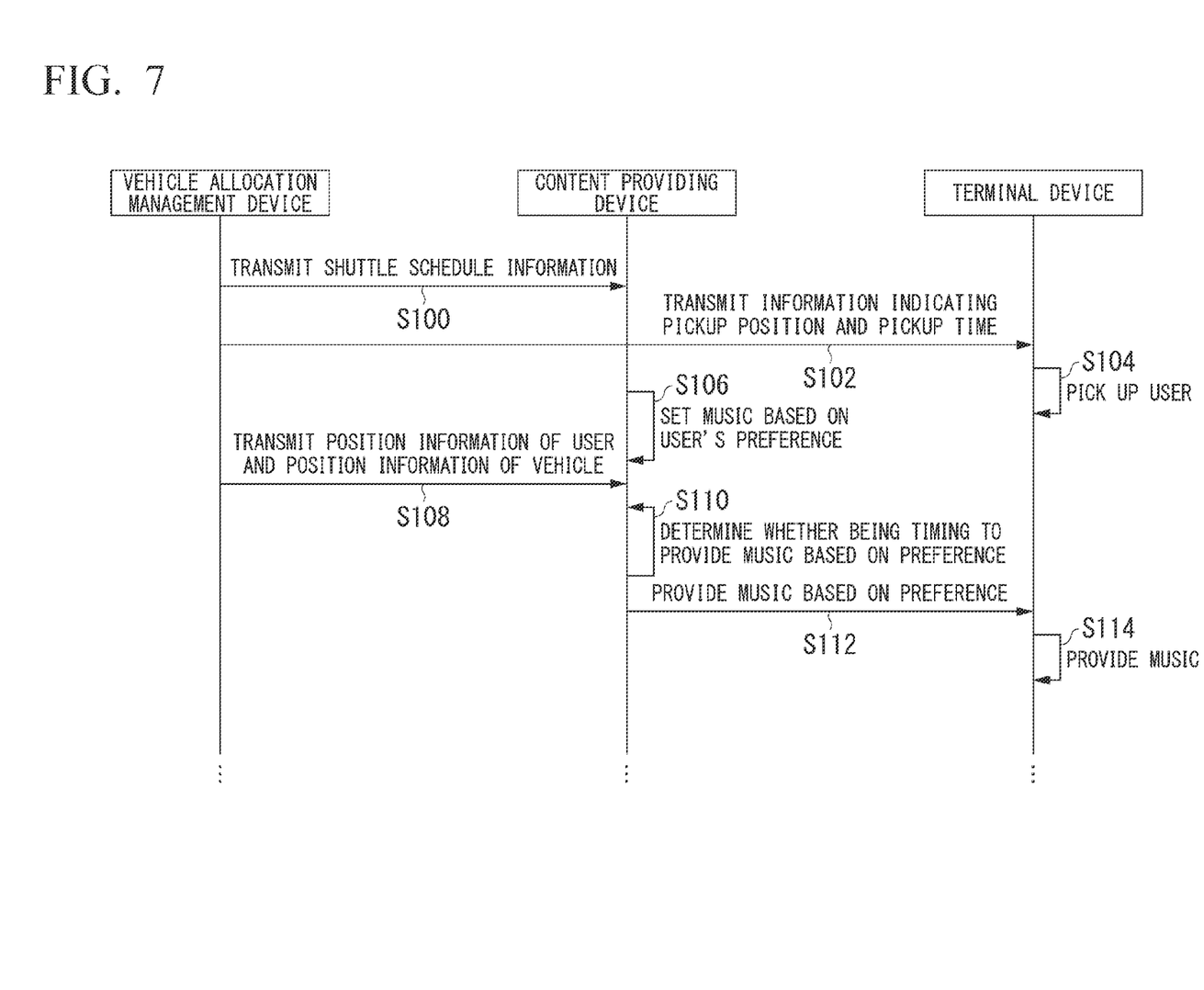
FIG. 7 is a sequence diagram illustrating an example of a flow of processing which is executed by the content providing system.

FIG. 7 is a sequence diagram illustrating an example of a flow of processing which is executed by the content providing system 1. When the vehicle allocation management device 50 determines the shuttle schedule on the basis of the user's request information, it transmits the shuttle schedule information 66 to the content providing device 100 (step S100). Next, the vehicle allocation management device 50 transmits information indicating the pickup position and pickup time of the shuttle schedule information 66 to the terminal device 10 of the vehicle (step S102). When the terminal device 10 of the vehicle acquires the information transmitted in step S102, it notifies the driver of the acquired pickup position and pickup time (step S104). The driver heads to the pickup position at the pickup time on the basis of the notification.

When the content providing device 100 acquires the shuttle schedule information 66 acquired in step S100, it extracts the user preference information associated with the user ID that matches the user ID included in the shuttle schedule information 66 in the user preference information 152 and sets music on the basis of the extracted user preference information (step S106). The setting unit 106 generates the music schedule information 154. Some or all of the information managed by the vehicle allocation management device 50 (for example, information such as the user ID) is shared with the content providing device 100.

Next, the vehicle allocation management device 50 transmits the position information of the user and the position information of the vehicle (step S108). The process of step S108 is repeatedly performed at predetermined intervals. The content providing device 100 determines whether it is a timing to provide music based on the user preference information on the basis of the position information of the user and the position information of the vehicle transmitted in step S108 (step S110). For example, in a case where the position information of the user and the position information of the vehicle indicate the same position, the user is on board the vehicle, and thus it is determined to be a timing to provide music based on the user preference information. Instead of the above, the content providing device 100 may determine that it is a timing to provide music based on the user preference information in a case where a time at which the user is scheduled to board the vehicle has arrived.

Next, the content providing device 100 provides the music based on the user preference information to the terminal device 10 (step S112). Next, the terminal device causes the speaker 22 to output the provided music (step S114).

As described above, the content providing system 1 allocates a vehicle in response to a user's request and provides music that meets the user's preference information in the allocated vehicle while the user is on board the vehicle. This makes it possible for the user to receive music that meets his/her preference, which leads to an improvement in the user's satisfaction.

Modification Example 1

Figure 8:
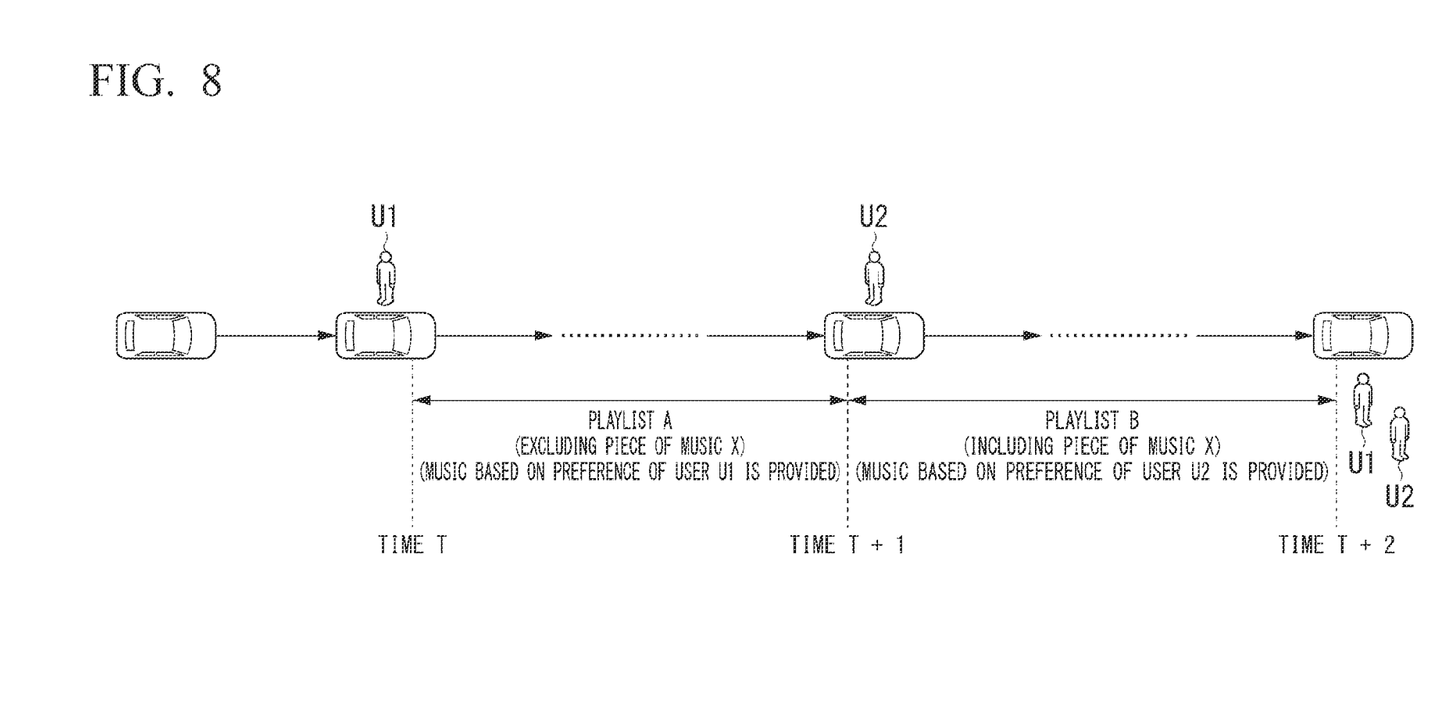
FIG. 8 is a diagram illustrating processing of a setting unit of Modification example 1.

In a case where a plurality of users board the vehicle, the content providing system 1 adjusts the music schedule information 154 of music to be provided in the vehicle such that target music meeting a target user's preference is set and the same music is not provided to a user different from the target user. The setting unit 106 acquires the music schedule information 154 of the music scheduled to be provided in the vehicle for a predetermined period of time before or after the time of use, and changes the music of the music schedule information 154 such that the target music or music similar to the target music is not included in a case where the target music or music similar to the target music is included in the music schedule information 154. Information on music similar to the target music is stored in the storage 150 in advance. The setting unit 106 refers to the information stored in the storage 150 to generate the music schedule information 154 such that music similar to the target music is not included.

FIG. 8 is a diagram illustrating processing of a setting unit 106 of Modification example 1. For example, it is assumed that a user U1 boards the vehicle at time T, a user U2 boards the vehicle at time T+1 and heads for the destination by performing ridesharing, and the user U1 and user U2 alight from the vehicle at time T+2. For example, the content providing device 100 adjusts the music schedule information 154 for providing music such that the same music is not provided to the user U1.

For example, the playlist A is scheduled to be provided to the user U1 from time T to time T+1, and a playlist B is scheduled to be provided to the user U1 and user U2 from time T+1 to time T+2. The playlist A is set on the basis of the preference of the user U1, and the playlist B is set on the basis of the preference of the user U2. In a case where a common piece of music X is included in the playlist A and the playlist B, the setting unit 106 excludes the piece of music X from the playlist A. This prevents the piece of music X from being provided to the user U1 multiple times in a short period of time and allows the piece of music X to be further provided to the user U2.

As described above, the content providing system 1 can improve the satisfaction of the user who boards the vehicle by changing the music schedule such that the same music is not provided to the same user.

Modification Example 2

Figure 9:
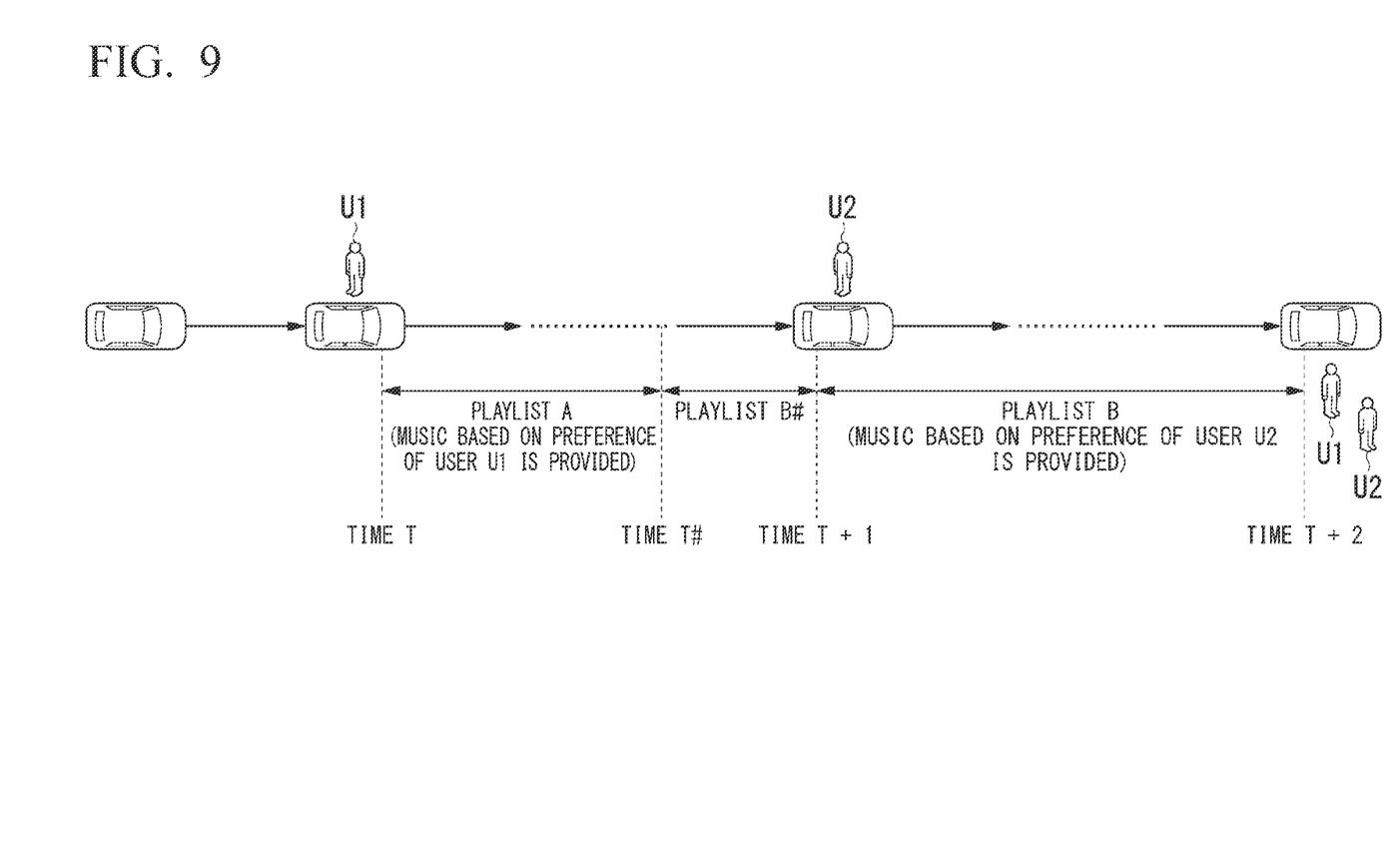
FIG. 9 is a diagram illustrating processing of a setting unit of Modification example 2.

The setting unit 106 acquires the music schedule information 154 of the music scheduled to be provided in the vehicle for a predetermined period of time before or after the time of use and changes the music of the music schedule information 154 to music which is identical or similar to the attribute of the target music in a case where the attribute of content included in the music schedule information 154 is not identical or similar to the attribute of the target music that meets the user's preference. The setting unit 106 acquires the music schedule information 154 of the music scheduled to be provided in the vehicle for a predetermined period of time before or after the time of use, and changes the music schedule information 154 such that the target music and music similar to the music of interest (an example of "content of interest") are provided between target music and the music of interest in a case where the attribute of the music of interest included in the music schedule information 154 is not identical or similar to the attribute of the target music. The music scheduled to be provided in the vehicle for a predetermined period of time before or after the time of use of the vehicle which is used by the user is an example of the "content of interest."

FIG. 9 is a diagram illustrating processing of a setting unit 106 of Modification example 2. A description will be given with focus on differences from FIG. 8. For example, the content providing device 100 adjusts the music schedule information 154 for providing music such that the user U1 does not feel that the attribute of the music have changed abruptly.

For example, the playlist A is scheduled to be provided to the user U1 from time T to time T+1, and the playlist B is scheduled to be provided to the user U1 and user U2 from time T+1 to time T+2. In a case where the attributes of the music of the playlist A and the playlist B are not identical or similar to each other, the music schedule information 154 is adjusted. As shown in FIG. 9, the setting unit 106 adjusts the music schedule information 154 such that a playlist B # is provided between time T # and time T+1 (or between time T+1 and time T+2) after the user U1 boards the vehicle and before the user U2 boards the vehicle.

The playlist B # is, for example, a playlist that does not give a sense of discomfort or abruptness to the user who listens to music when switching from the playlist A to the playlist B # and switching from the playlist B # to a playlist C. For example, in a case where the playlist A is classic music and the playlist B is punk rock music, switching from classic music to punk rock music may cause the user U1 to feel a sense of discomfort or abruptness. For example, in a case where the playlist B # is a playlist provided in the order of jazz, pop, and rock, the genre of music gradually approaches punk rock music from classic music, which leads to a reduction in the sense of discomfort or abruptness.

The playlist B # is an example of "music with an attribute which is identical or similar to the attribute of the target music" and "music with attributes which are identical or similar to the attribute of the target music and the attribute of the music of interest." For example, information on music identical or similar to the attribute of the target music or the attribute of the music of interest is stored in the storage 150 in advance. The setting unit 106 refers to the information stored in the storage 150 to specify music with an attribute which is identical or similar to the attribute of the target music or the music of interest and to generate the music schedule information 154.

The above example has been described as providing the playlist B #, but instead of (or in addition to) this, the playlist B may be close to the genre of the playlist A.

Modification example 1 and Modification example 2 have been described with a focus on the users U1 and U2. However, even in a case where a user U3 boards the vehicle after the user U2, the content providing system 1 may generate the music schedule information 154 such that music is not provided redundantly or the attribute of the music is not changed abruptly.

In a case where the content providing device 100 provides video instead of music, the video may be set on the basis of preference information. In this case, the content providing device 100 sets the video in the same manner as the concept of each embodiment described above.

According to the embodiments described above, the content providing device 100 sets content that meets the user's preference on the basis of information indicating the user's content preference, and thus content that meets the preference is provided in the vehicle, which leads to an improvement in the user's satisfaction. For example, in a case where individual users operate their own terminals to view content using individual users' terminals, individual users' operations are required, and thus the users' convenience may be low in some cases. Further, in a case where content is viewed using individual users' terminals as described above, it may not be possible to enjoy the atmosphere of the place by viewing the content together with other occupants who are on board the vehicle. On the other hand, in the present embodiment, content that meets the user's preference is provided without depending on the user's operation, and thus the user's convenience and satisfaction are improved. In the present embodiment, further, content can be viewed together with other occupants who are on board the vehicle and the atmosphere and movement of the place can be enjoyed more, which leads to an improvement in the user's satisfaction.

The above-described embodiment can be represented as follows.

A content providing device including:
a storage medium having computer-readable instructions stored therein; and
a processor connected to the storage medium,
the processor executing the computer-readable instructions to
acquire information for specifying a time of use of a vehicle for public transportation which is used by a user who plans to use the vehicle and information indicating the user's content preference, and
set content to be provided in the vehicle (hereinafter referred to as target content) on the basis of the acquired information.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A content providing system wherein one or more processors
acquire information, representing acquired information, for specifying a time of use of a vehicle for public transportation which is used by a user who plans to use the vehicle and information indicating the user's content preference, and
set content to be provided in the vehicle based on the acquired information, wherein the set content represents target content,
cause an output device inside the vehicle to output the set target content to provide a plurality of users inside the vehicle with target content,
in a case that a first user of the plurality of users plans to board the vehicle in a first period of time in which the vehicle travels from a first position to a second position, and the first user and a second user of the plurality of users plan to board the vehicle in a second period of time in which the vehicle travels from the second position to a third position, the second period of time being subsequent to the first period of time,
acquire a first schedule information for a first content scheduled to be provided in the vehicle for the first period of time and a second schedule information for a second content to be provided in the vehicle for a second period of time, and
the first schedule information including a first content satisfying a preference of the first user, and
the second schedule information including a second content satisfying a preference of the second user,
change the first content included in the first schedule information such that the first content mirrors, or is similar to, the second content included in the second schedule information is not included, in a case where the first content satisfying the preference of the first user included in the first schedule information is similar to the second content satisfying the preference of the second user included in the second schedule information, and
cause the output device inside the vehicle to output content that has changed to provide the first user with the content that has changed in the first period of time.

2. The content providing system according to claim 1, wherein the information for specifying time of use of the vehicle is one or both of a time designated by the user as the time of use of the vehicle and a combination of a boarding position and an alighting position designated by the user and a boarding time and an alighting time estimated on the basis of traffic information.

3. The content providing system according to claim 1, wherein the vehicle is a ridesharing vehicle which is boarded by a plurality of users at different positions, and
the one or more processors set target content that meets preferences of one or more target users among the plurality of users and adjust a schedule of content to be provided in the vehicle such that the same content is not provided to users different from the target users.

4. The content providing system according to claim 1, wherein the one or more processors set content that meets the user's preference within the time of use as target content to be provided in the vehicle to provide the user with the target content via a device which is used by the user.

5. A content providing system wherein one or more processors
acquire information, representing acquired information, for specifying a time of use of a vehicle for public transportation which is used by a user who plans to use the vehicle and information indicating a content preference associated with the user, and set content, representing target content, to be provided in the vehicle based on the acquired information, cause an output device inside of the vehicle to output the target content to provide a plurality of users inside of the vehicle with the target content, in a case that a first user of the plurality of users plans to board the vehicle in a first period of time in which the vehicle travels from a first position to a second position and the first user and a second user of the plurality of users plans to board the vehicle in a second period of time in which the vehicle travels from the second position to a third position, the second period of time being subsequent to the first period of time, acquire a first schedule information for a first content scheduled to be provided in the vehicle for the first period of time and a second schedule information for a second content scheduled to be provided in the vehicle for the second period of time, and the first schedule information including a first content satisfying a first preference associated with the first user, and the second schedule information including a second content satisfying a second preference associated with the second user change the first content included in the first schedule information to content having a first attribute such that the first attribute of the content is identical to, or similar to, a second attribute included in the second schedule information, in a case where the first attribute of the content satisfies the first preference of the first user included in the first schedule information is not identical to, or similar to, a second attribute of the content satisfying the second preference associated with the second user included in the second schedule information, and cause the output device inside the vehicle to output content that has changed to provide the first user with the content that has changed in the first period of time.

6. A content providing system wherein one or more processors acquire information, representing acquired information, for specifying a time of use of a vehicle for public transportation which is used by a user who plans to use the vehicle and information indicating a content preference associated with the user, and set content, representing target content, to be provided in the vehicle based on the acquired information, cause an output device inside the vehicle to output the target content to provide a plurality of users inside the vehicle with the target content, in a case that a first user of the plurality of users plans to board the vehicle in a first period of time in which the vehicle travels from a first position to a second position, and the first user and a second user of the plurality of users plans to board the vehicle in a second period of time in which the vehicle travels from the second position to a third position, the second period of time being subsequent to the first period of time, acquire a first schedule information for a content scheduled to be provided in the vehicle for the first period of time and a second schedule information for a content scheduled to be provided in the vehicle for the second period of time, and the first schedule information including first content satisfying a preference associated with the first user, and the second schedule information including second content satisfying a preference associated with the second user, set content between the first content and the second content so that the content between the first content and the second content is provided between the first schedule information and the second schedule information, in a case where a first attribute associated with the first content satisfies a first preference associated with the first user and included in the first schedule information is not identical to, or similar to, a second attribute associated with the second content associated with a second preference associated with the second user and included in the second schedule information, the content between the first content and the second content being content having a third attribute similar to the first attribute included in the first schedule information and the second attribute included in the second schedule information, and cause the output device inside the vehicle to output content between the first content and the second content so that the content between the first content and the second content is provided between content of the first schedule information and content of the second schedule information.

* * * * *